US010009739B2

(12) United States Patent
Salmi et al.

(10) Patent No.: US 10,009,739 B2
(45) Date of Patent: *Jun. 26, 2018

(54) METHOD FOR PRESENTING INFORMATION CONTAINED IN MESSAGES IN A MULTIMEDIA TERMINAL, A SYSTEM FOR TRANSMITTING MULTIMEDIA MESSAGES, AND A MULTIMEDIA TERMINAL

(71) Applicant: Microsoft Technology Licensing, LLC, Redmond, WA (US)

(72) Inventors: Matti Salmi, Tampere (FI); Dogu Cetin, Yli/Ankara (TR); Miska Hannuksela, Tampere (FI); Roberto Castagno, Tampere (FI); Mika Rantanen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/151,425

(22) Filed: May 10, 2016

(65) Prior Publication Data
US 2016/0277904 A1    Sep. 22, 2016

Related U.S. Application Data

(63) Continuation of application No. 14/161,808, filed on Jan. 23, 2014, now Pat. No. 9,338,109, which is a (Continued)

(30) Foreign Application Priority Data

Jan. 17, 2000    (FI) ..................................... 20000089

(51) Int. Cl.
*H04W 4/12*    (2009.01)
*G06F 17/30*    (2006.01)
(Continued)

(52) U.S. Cl.
CPC .......... *H04W 4/12* (2013.01); *G06F 17/3089* (2013.01); *H04L 29/06* (2013.01);
(Continued)

(58) Field of Classification Search
CPC ................. G06F 17/3089; H04L 29/06; H04L 29/06027; H04W 4/12
See application file for complete search history.

(56) References Cited

U.S. PATENT DOCUMENTS 6,332,163 B1    12/2001    Bowman-Amuah
6,421,707 B1    7/2002    Miller et al.
(Continued)

FOREIGN PATENT DOCUMENTS

| WO | 9708837 A2 | 3/1997 |
| WO | 9941920 A1 | 8/1999 |
| WO | 9966746 A2 | 12/1999 |
| WO | 0133781 A1 | 5/2001 |

OTHER PUBLICATIONS

"Synchronized Multimedia Integration Language (SMIL) 1.0 Specification", In World Wide Web Consortium Recommendation, Jun. 15, 1998, 39 Pages.
(Continued)

*Primary Examiner* — Ranodhi Serrao
(74) *Attorney, Agent, or Firm* — Ray Quinney & Nebeker, P.C.; Thomas M. Hardman; Miia Sula

(57) ABSTRACT

A method for presenting information contained in messages in a terminal (MS). In the method, the message includes at least one component. The message is transmitted to a terminal (MS) in a system for transmitting multimedia messages. In the method, a presentation model (SMIL) is formed to contain information related to the presentation of each component attached in the message. The aforementioned presentation model (SMIL) is supplemented with a reference about the location of each component in the
(Continued)

message, and the aforementioned presentation model (SMIL) is attached to the aforementioned message.

20 Claims, 8 Drawing Sheets

Related U.S. Application Data continuation of application No. 13/722,470, filed on Dec. 20, 2012, now Pat. No. 8,667,073, which is a continuation of application No. 09/761,040, filed on Jan. 16, 2001, now Pat. No. 8,364,762.

(51) Int. Cl.
| | |
|---|---|
| *H04L 29/06* | (2006.01) |
| *H04L 12/58* | (2006.01) |
| *H04L 29/08* | (2006.01) |
| *H04L 12/24* | (2006.01) |
| *H04W 88/02* | (2009.01) |
| *H04W 88/16* | (2009.01) |

(52) U.S. Cl.
CPC ........ *H04L 29/06027* (2013.01); *H04L 41/22* (2013.01); *H04L 51/04* (2013.01); *H04L 51/10* (2013.01); *H04L 67/04* (2013.01); *H04L 69/329* (2013.01); *H04M 2207/40* (2013.01); *H04W 88/02* (2013.01); *H04W 88/16* (2013.01)

(56) References Cited

U.S. PATENT DOCUMENTS

| | | | |
|---|---|---|---|
| 6,446,082 B1 | 9/2002 | Arita | |
| 6,480,191 B1 | 11/2002 | Balabanovic | |
| 6,487,663 B1 | 11/2002 | Jaisimha et al. | |
| 6,615,253 B1 | 9/2003 | Bowman-Amuah | |
| 6,640,238 B1 | 10/2003 | Bowman-Amuah | |
| 6,654,030 B1 * | 11/2003 | Hui .................. | G06F 17/30017 707/E17.009 |
| 6,701,383 B1 | 3/2004 | Wason et al. | |
| 6,715,126 B1 | 3/2004 | Chang et al. | |
| 6,745,368 B1 | 6/2004 | Boucher et al. | |
| 7,308,697 B1 | 12/2007 | Jerding et al. | |
| 7,894,832 B1 | 2/2011 | Fischer et al. | |
| 2001/0020954 A1 | 9/2001 | Hull et al. | |
| 2004/0030994 A1 | 2/2004 | Hui et al. | |

OTHER PUBLICATIONS

"Final Office Action Issued in U.S. Appl. No. 09/761,040", dated Jun. 17, 2005, 17 Pages.
"Final Office Action Issued in U.S. Appl. No. 09/761,040", dated Jun. 23, 2006, 17 Pages.
"Final Office Action Issued in U.S. Appl. No. 09/761,040", dated May 14, 2007, 22 Pages.
"Final Office Action Issued in U.S. Appl. No. 09/761,040", dated Aug. 4, 2010, 10 Pages.
"Final Office Action Issued in U.S. Appl. No. 09/761,040", dated Jul. 13, 2012, 6 Pages.
"Non Final Office Action Issued in U.S. Appl. No. 09/761,040", dated Jun. 6, 2011, 10 Pages.
"Non Final Office Action Issued in U.S. Appl. No. 09/761,040", dated Jan. 3, 2012, 10 Pages.
"Non Final Office Action Issued in U.S. Appl. No. 09/761,040", dated Oct. 3, 2006, 23 Pages.
"Non Final Office Action Issued in U.S. Appl. No. 09/761,040", dated Dec. 29, 2005, 15 Pages.
"Non Final Office Action Issued in U.S. Appl. No. 09/761,040", dated Oct. 22, 2004, 20 Pages.
"Notice of Allowance Issued in U.S. Appl. No. 09/761,040", dated Sep. 24, 2012, 5 Pages.
"Notice of Allowance Issued in U.S. Appl. No. 13/722,470", dated Oct. 15, 2013, 15 Pages.
"Non Final Office Action Issued in U.S. Appl. No. 14/161,808", dated Oct. 8, 2015, 11 Pages.
"Notice of Allowance Issued in U.S. Appl. No. 14/161,808", dated Feb. 24, 2016, 13 Pages.
"Response to EP Communication Filed in European Patent Application No. 14187574.0", Filed Date: Aug. 5, 2015, 4 Pages.
"Search Report Issued in European Patent Application No. 14187574.0", dated Nov. 13, 2014, 7 Pages.
Ayars, et al., "Synchronized Multimedia Integration Language Boston Specification", In World Wide Web Consortium Working Draft, Nov. 15, 1999, 175 Pages.
Bulterman, et al., "GRiNS: An Authoring Environment for Web Multimedia", In World Conference on Educational Multimedia, Hypermedia and Educational Telecommunications (ED-MEDIA), Jun. 19, 1999, 6 Pages.
Flammia, Glovanni, "SMIL Makes Web Applications Multimodal", In IEEE Intelligent Systems and their Applications, vol. 13, Issue 4, Jul. 1998, pp. 12-13.
Morishima, et al., "Dynamic Creation of Multimedia Web Views on Heterogeneous Information Sources", In Proceedings of the 33rd Annual Hawaii International Conference on System Sciences, Jan. 4, 2000, 10 Pages.
Palme, et al., "MIME Encapsulation of Aggregate Documents, such as HTML (MHTML)", In Network Working Group, Request for Comment: 2557, Mar. 1999, 28 Pages.
Rutledge, et al., "Practical Application of Existing Hypermedia Standards and Tools", In Proceedings of the Third ACM Conference on Digital Libraries, May 11, 1998, pp. 191-199.
Rutledge, et al., "The Use of SMIL: Multimedia Research Currently Applied on a Global Scale", In 7th International Conference on Multimedia Modeling, Oct. 4, 1999, 17 Pages.

* cited by examiner

METHOD FOR PRESENTING INFORMATION CONTAINED IN MESSAGES IN A MULTIMEDIA TERMINAL, A SYSTEM FOR TRANSMITTING MULTIMEDIA MESSAGES, AND A MULTIMEDIA TERMINAL

CROSS-REFERENCE TO RELATED APPLICATIONS

This is a continuation of U.S. application Ser. No. 14/161,808, filed on Jan. 23, 2014 and issued as U.S. Pat. No. 9,338,109, which is a continuation of U.S. application Ser. No. 13/722,470, filed on Dec. 20, 2012, and issued as U.S. Pat. No. 8,667,073, which is a continuation of U.S. application Ser. No. 09/761,040, filed on Jan. 16, 2001 and issued as U.S. Pat. No. 8,364,762, the disclosures of which are incorporated herein by reference in their entirety.

BACKGROUND

The disclosed embodiments relate to a method for presenting information contained in messages in a user interface of a multimedia terminal, in which method a message contains at least one component, and which message is transmitted to the multimedia terminal in a system for transmitting multimedia messages. The disclosed embodiments also relate to a system for transmitting multimedia messages, comprising means for transmitting a message to a multimedia terminal which comprises a user efface for presenting information contained in the messages, and each message contains at least one component. Furthermore, the disclosed embodiments relate to a transmitting multimedia terminal which comprises means for forming messages of at least one component, and means for transmitting the messages. The disclosed embodiments also relate to a receiving multimedia terminal which comprises means for receiving messages, and a user interface for presenting information contained in the messages, and each message contains at least one component.

Wireless communication networks and the Internet network expand fast, and the number of their users is increasing. It is possible to introduce Internet services in digital mobile stations, of wireless communication networks, such as so-called media phones, for example by the WAP technology. The WAP (Wireless Application Protocol) is an open standard which is designed to support globally a majority of digital mobile communication networks, such as the GSM (Global System for Mobile communications), GPRS (General Packet Radio Service), PDC (Personal Digital Cellular), CDMA IS-95 (Code Division Multiple Access), TOMA IS-136 (Time Division Multiple Access), and third generation networks, such as the WCDMA (Wideband COMA) and CDMA-2000. Because the WAP system was developed only recently and because the specifications of the WAP sys define in some cases only the framework for different implementations, there are no known solutions for implementing certain functions of the WAP system.

In the WAP system (FIG. 1), the terminal using the WAP protocol for external communication, the wireless terminal MS (wireless terminal, mobile station), here a so-called WAP terminal, can communicate with a server in the Internet network. One example to be mentioned of such a wireless terminal available as a WAP terminal is Nokia 7110. The display of the WAP terminal is relatively small, which restricts the quantity of information to be displayed on the display at a time. This causes problems e.g. when browsing Internet home pages which are typically designed to be presented on the display of an ordinary computer.

The connection between the WAP terminal and the Internet network is implemented by a WAP gateway which functions as a means for transmitting messages between the WAP terminal MS and the Internet network 18. If necessary, the WAP gateway 15 converts the messages addressed by the WAP terminal MS to the Internet network 18 to messages complying with an Internet protocol, such as the TCP/IP protocol (Transmission Control Protocol/Internet Protocol). In a corresponding way, messages addressed from the Internet network 18 to the WAP terminal MS in the wireless network 12 are converted, if necessary, in the WAP gateway 16 to messages complying with the WAP protocol (e.g. WSP, Wireless Session Protocol). The WAP terminal MS can be, per se, any device which uses the WAP protocol for external communication, such as a mobile station of a cellular network or a computer terminal communicating with the wireless network 12 for example via a mobile station of a cellular network. Communication forms supported by the WAP and intended for the transmission of information over the radio channel are called bearers. In the different networks supported by the WAP, these include, e.g., short messages (SMS, Short Message Service), data calls (CSD, Circuit Switched Data) and packet radio or GPRS services, the USSD service (Unstructured Supplementary Service Data), as well as other bearers defined in the WAP specifications.

With respect to the protocols, the WAP system is a hierarchical system. Both the WAP terminal and the WAP gateway comprise a WAP protocol stack to be implemented by means of software, comprising certain WAP protocol layers. The WAP protocol layers include e.g. the WAE layer (Wireless Application Environment), the WAP layer (Wireless Session Protocol), the WAP layer (Wireless Transaction Protocol), and the WOP layer (Wireless Datagram Protocol). The corresponding WAP protocol layers of the WAP terminal and the WAP gateway communicate with each other to implement reliable data transmission between the WAP terminal and the WAP gateway over the defined bearer.

Users of a computer terminal communicating with the Internet network have already for a long time had the chance to retrieve multimedia components, such as short video clips and audio clips in electrical format. As the transmission rates are increased and the properties of mobile stations are improved, interest in the service of transmitting a multimedia message has now arisen also in the mobile network. However, for example in connection with the WAP system, no solution has been presented so far to implement displaying of the multimedia message.

SUMMARY

In the Internet network, it is known to use the hypertext markup language (HTML) which can be used for presenting e.g. the location, content, color and size for multimedia information to be presented on Internet pages. However, the HTML language does not offer a possibility to determine the time of effect of multimedia components, such as the time of displaying a text or the time of playing a sound. Furthermore, with the presently known versions of the HTML language, it is not possible to define transparency presentations in which the multimedia presentation consists of several pages. However, to make the presentation of various advertisements and other information more effective, there is a need to produce e.g. variable parts in the content of pages as well as a need to combine several pages to one presentation. Recently, some solutions have been developed, such as the JAVA programming language, whereby it is possible to implement variable effects of some kind. In view of WAP terminals, however, it is one drawback of such solutions that their implementation requires a relatively large processing and storage capacity in the terminal. This restricts the introduction of the JAVA programming language particularly in portable terminals. In presentations implemented with the JAVA programming language, it is not only the actual presentation information but also the JAVA program for presenting the information that is transmitted.

A fast increase in the use of portable multimedia terminals increases the need to implement versatile messages, such as multimedia messages, in a multimedia terminal.

It is an aim of the presently disclosed embodiments to provide a method for presenting messages and a multimedia terminal for presenting messages. The method according to the presently disclosed embodiments is characterized in that in the method, a presentation model is formed to contain information related to at least one component connected with the message, that said presentation model is supplemented with a reference to the location of data related to presenting at least one component in said message, and that said presentation model is added to said message. The system for transmitting multimedia messages according to the presently disclosed embodiments is characterized in that the system comprises means for forming a presentation model in the message, the presentation model comprising information related to presenting at least one component in said message. The transmitting multimedia terminal according to the presently disclosed embodiments is characterized in that the multimedia terminal also comprises means for forming a presentation model in the message, which presentation model comprises information related to presenting at least one component added in the message, and which presentation model is supplemented with a reference to the location of information related to presenting at least one component in said message. Furthermore, the receiving multimedia terminal according to the presently disclosed embodiments is characterized in that the multimedia terminal also comprises means for interpreting a presentation model formed in a message, which presentation model comprises information related to presenting at least one component, and which presentation model is supplemented with a reference to the location of information related to presenting at least one component in said message, wherein the multimedia terminal comprises means for finding out said presentation model from said message. The disclosed embodiments are based on the idea that the presentation parameters of the components added to the messages are added to the message, and these parameters are formed on a description language.

With the presently disclosed embodiments, significant advantages are achieved in comparison with solutions of prior art. When applying the method according to the disclosed embodiments, a wireless multimedia terminal can be used to present messages, and the messages can also be supplemented with components varying in time. The implementation of this does not require such a large processing and storage capacity as when solutions of prior art are used. Furthermore, the method according to the disclosed embodiments can be used to form presentations consisting of several pages to be presented in a multimedia terminal.

BRIEF DESCRIPTION OF THE DRAWINGS

In the following, the disclosed embodiment will be described in more detail reference to the appended drawings, in which.

DETAILED DESCRIPTION

In the following, the disclosed embodiments will be described by using as examples multimedia messages with one or several multimedia components. However, the disclosed embodiments are not limited solely to multimedia messages, but the messages used can also be other messages with one or several components. Moreover, this component does not need to be a multimedia component but it can also be another component containing information.

Figure 3:
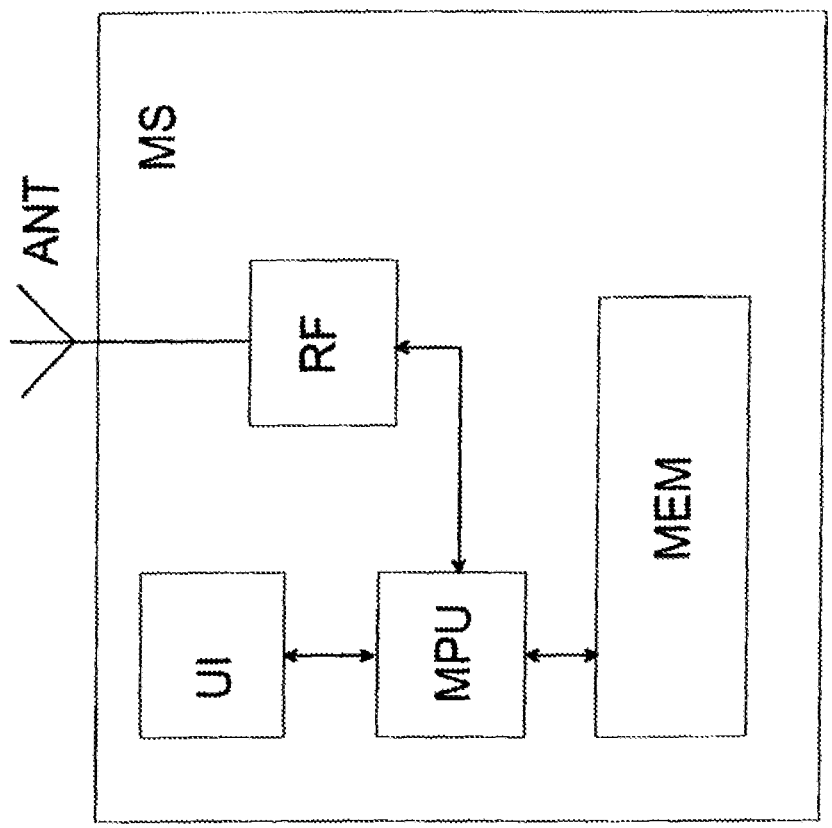
FIG. 3 illustrates the implementation of essential parts of a mobile station implementing the method according to the disclosed embodiments.

FIG. 3 illustrates parts which are essential for the operation of a mobile terminal MS applying the method according to the disclosed embodiments. The mobile terminal MS comprises a processor MPU and parts functionally coupled with the processor: a memory MEM, a user interface UI and a radio part RF. The processor MPU is preferably a microprocessor, a microcontroller or a digital signal processor DSP. The memory MEM preferably comprises a non-volatile memory (ROM, read only memory) and a read-alter storage (RAM, random access memory), The radio part RF can transmit radio frequency signals, such as messages complying with the WAP protocol, and receive radio frequency signals, such as multimedia messages, via an antenna ANT. The user interface UI preferably offers the user a display and a keyboard for using the mobile terminal MS.

The software of the mobile terminal MS, including the software relating to setting up and presenting multimedia messages, is typically stored in a non-erasable memory. On the basis of the software, the processor MPU controls the operation of the mobile terminal MS, such as the use of the radio part RF, the presentation of the messages with the user interface UI, and the reading of input received from the user interface UI. The user interface UI preferably comprises a display DP, a keyboard KB and audio means AUDIO. The software, which can be implemented in a variety of ways, preferably comprises program blocks which are responsible for implementing the different operations. These operations include, e.g., the operations related to displaying multimedia components contained in multimedia message to the user, as well as the operations related to transmitting and receiving messages. The multimedia message transmission service is implemented in the mobile terminal MS by the processor MPU together with the software and memory MEM of the mobile terminal. The read-write storage is used by the processor MPU as a temporary buffer memory during data processing.

Figure 1:
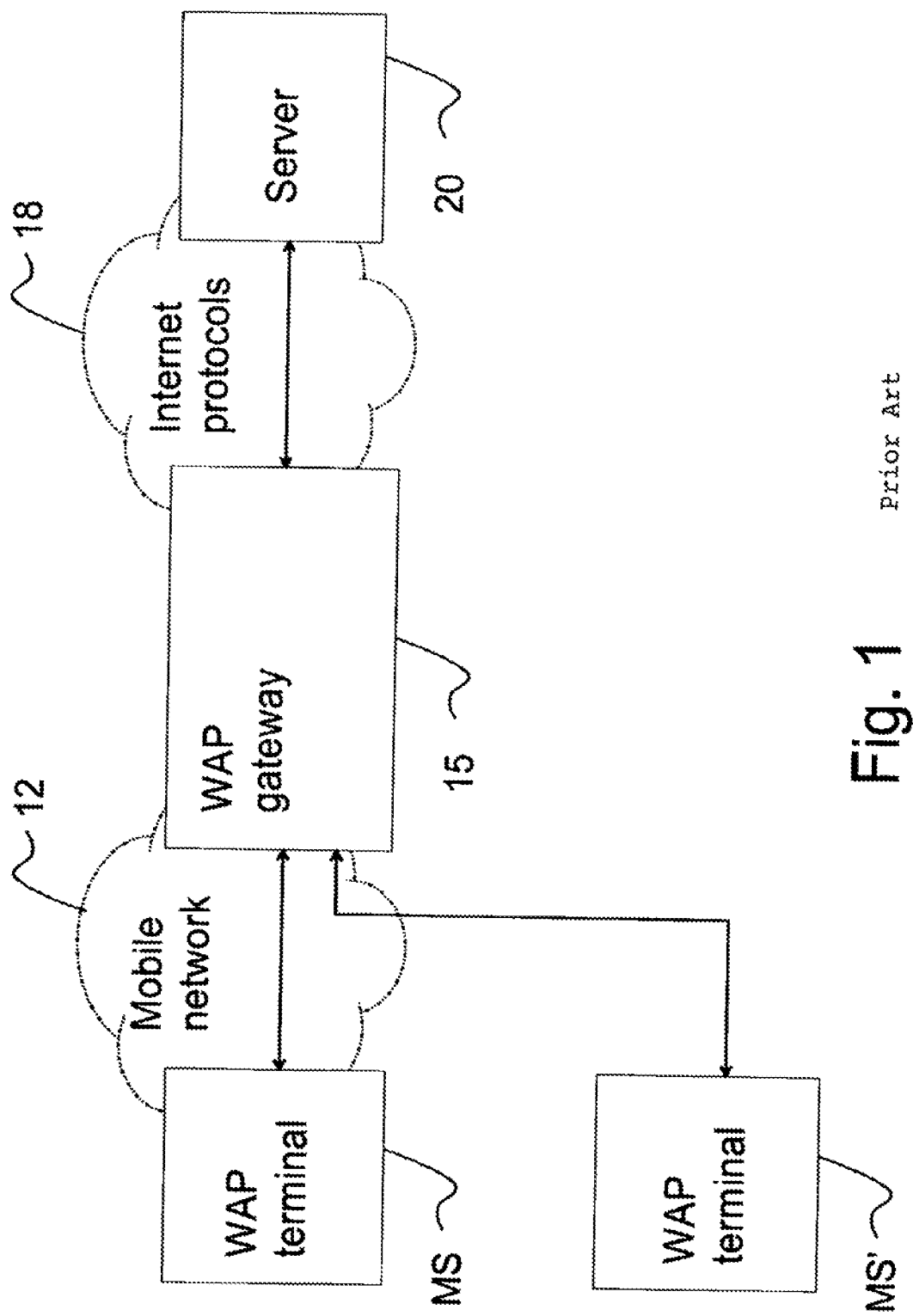
FIG. 1 shows a model of the WAP system according to the prior art.
Figure 2:
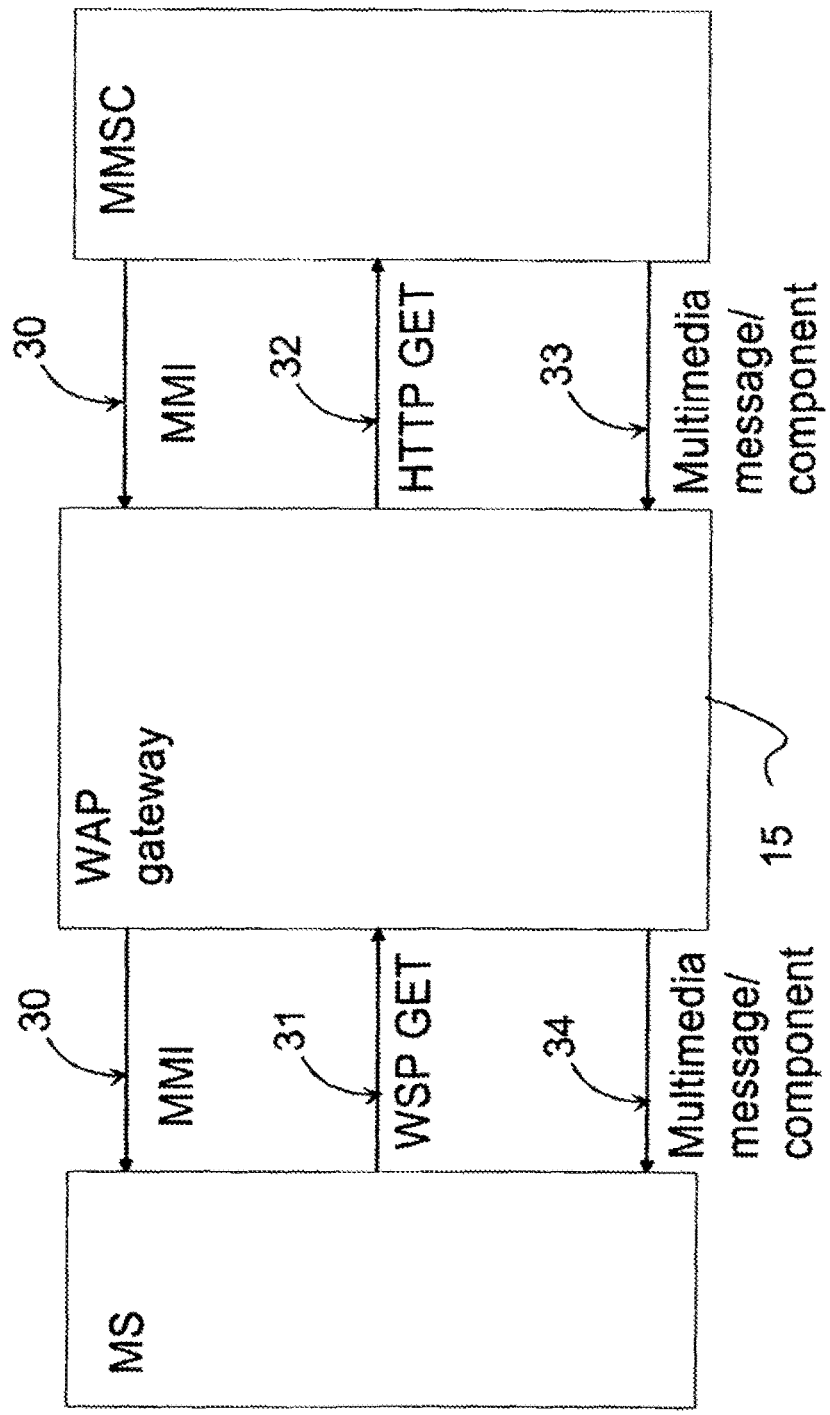
FIG. 2 illustrates the implementation of a method according to the disclosed embodiments.

The WAP system according to FIG. 1 is presented above in connection with the description of prior art. The appended FIG. 2 illustrates the service of transmitting multimedia messages in a situation in which a mobile terminal MS using the WAP protocol for external communication has subscribed the multimedia message transmission service from a multimedia message service center MMSC. The multimedia message service center MMSC is a network element, a server, which can be located e.g. in a cellular network or in the Internet network. The multimedia message service center MMSC operates in the multimedia message transmission service as a means which stores a multimedia message addressed to a mobile terminal MS in its memory. The multimedia message service center MMSC transmits a notification message about the arrival of a multimedia message to the mobile terminal MS when it is available.

The multimedia message service center MMSC communicates with the mobile terminal MS via a WAP gateway 15. Physically, the multimedia message service center MMSC is preferably located in the same part of the Internet network as the WAP gateway 15. Communication between the multimedia message service center MMSC and the WAP gateway 15 is typically implemented according to the protocols of the Internet networks (IP protocols). These include e.g. TCP/IP and HTTP 1.1.

When a multimedia message containing one or several multimedia components and addressed to a mobile station MS which has subscribed the multimedia message transmission service from the multimedia message service center MMSC, is received at the media message service center MMSC, it stores the multimedia message in its memory and transmits a notification message 30 to the mobile terminal to notify about the stored multimedia message. After this, the user of the mobile terminal MS can retrieve the multimedia message at the best moment of time, or the message can be transmitted to the mobile terminal MS automatically without operations by the user. The multimedia components can be e.g. text, images, photographs, audio clips, or video clips in electrical form. One multimedia message can also contain multimedia components of different types.

In at least one embodiment for implementing the notification message 30, a content type which is here referred to as MMN (multimedia message notification) is used in the WAP system. The MMN is a content type which is defined in such a way that it allows the transmission of data both in text format and in binary format in the same content type. The MMN content type is preferably allocated an Internet compatible presentation form in the XML format (extensible markup language) and binary format complying with WAP binary coding. One possible rough structure of the notification message 30 of the MMN type is presented in the appended FIG. 5a in which the notification message 30 comprises a general information part 36, fields 37 for expressing the properties of the multimedia components (two in the example of FIG. 5a) contained in the multimedia messages.

Figure 4A:
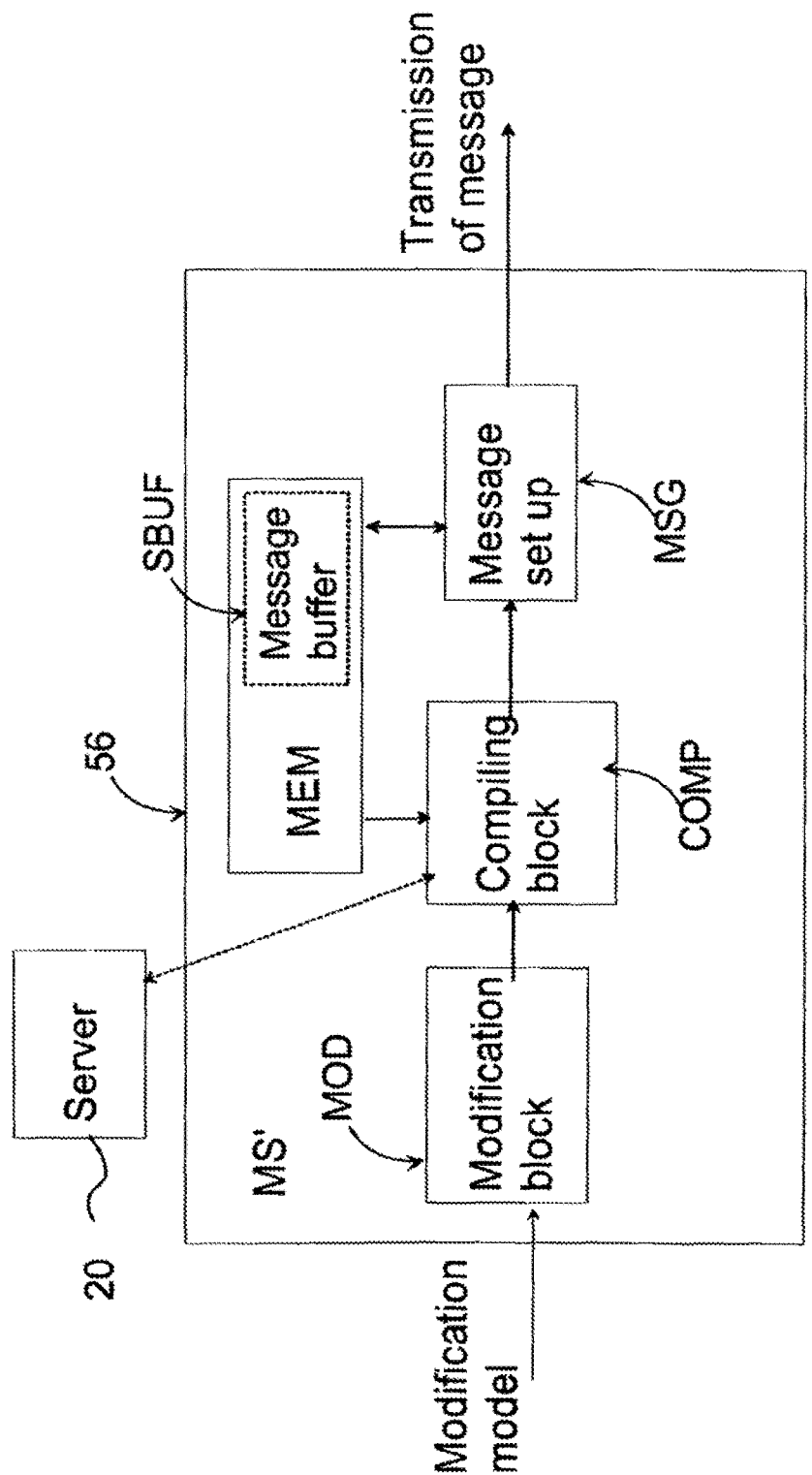
FIG. 4a shows, in a block chart, functional block of setting, up a multimedia message in a transmitting multimedia terminal.
Figure 4B:
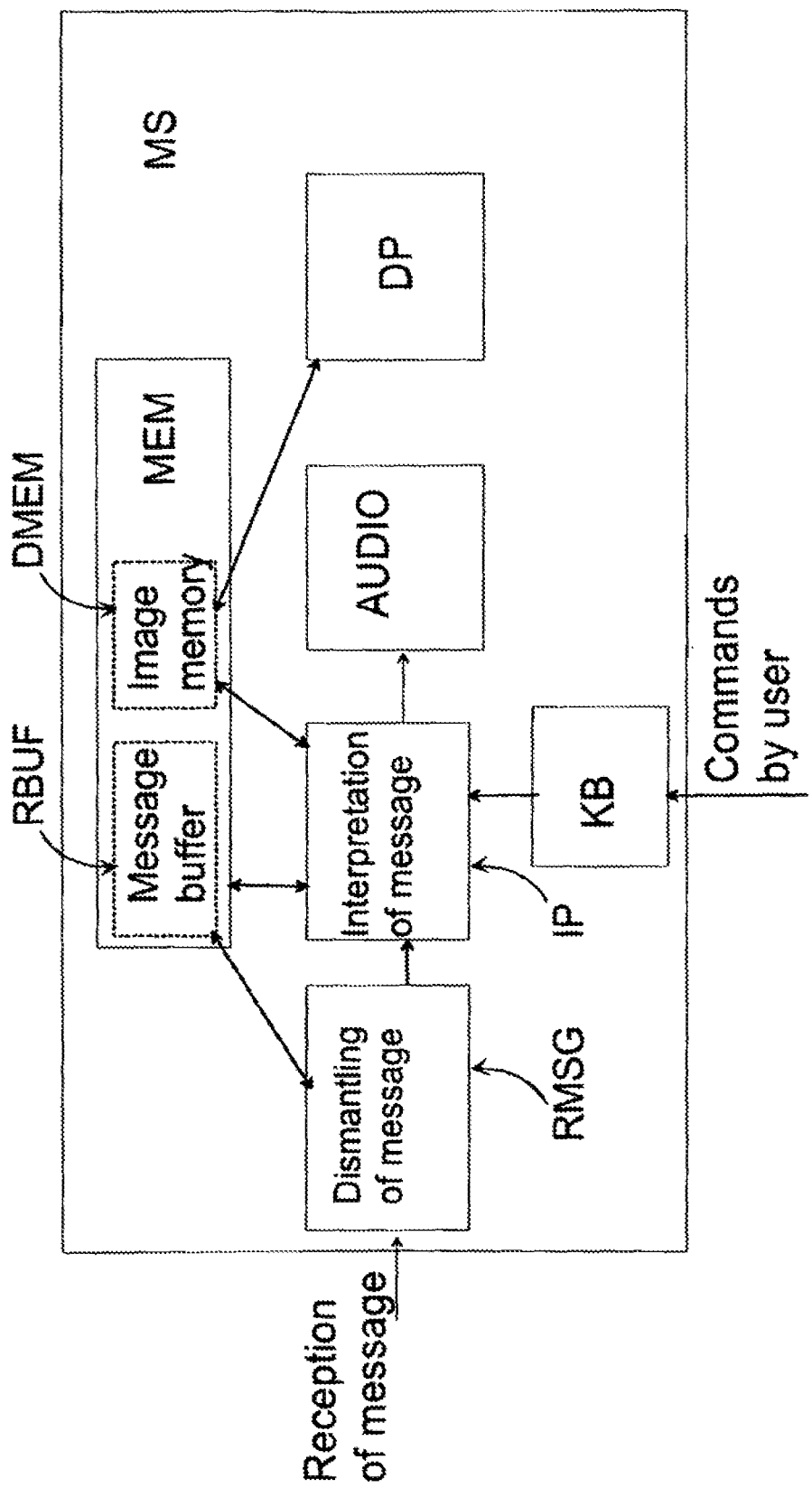
FIG. 4b shows, in a block chart, functional blocks of interpreting a multimedia message in a receiving multimedia terminal.
Figure 6A:
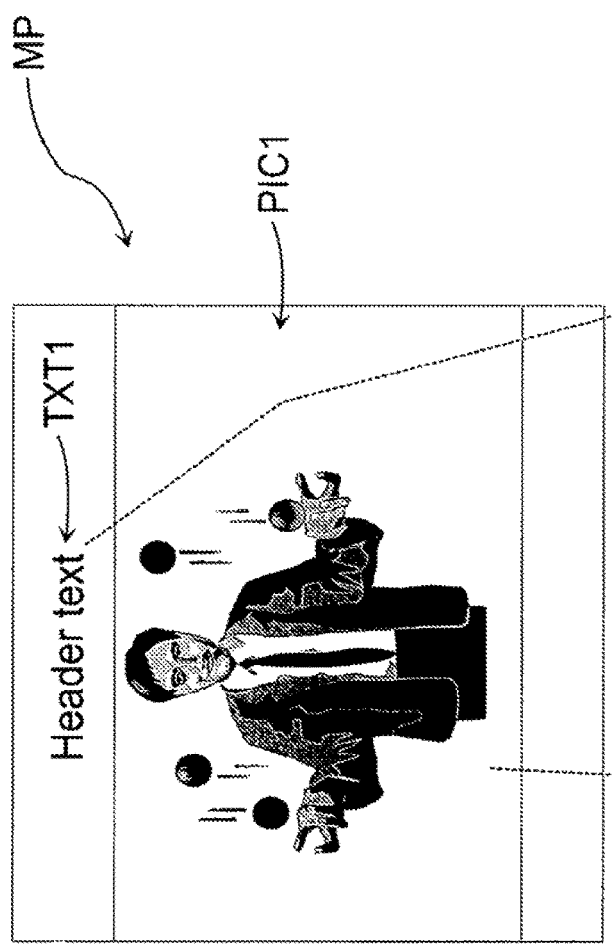
FIG. 6a shows an example of a multimedia page.

FIG. 4a shows, in a reduced block chart, the setting up of multimedia messages in the transmitting device, such as a multimedia terminal MS', and FIG. 4b shows the presentation of multimedia messages in a multimedia terminal, such as a mobile terminal MS. The setting up of multimedia messages is presented by a modification block MOD which can be e.g. the user interface UI of the terminal. It contains the necessary functions to present and edit multimedia components, such as images, text, audio and/or video. Thus, the person setting up a multimedia presentation can construct a multimedia page by compiling the desired multimedia components, by editing them, if necessary, and by placing them in the desired locations. The multimedia components are stored e.g. as files which can be retrieved for example from the memory means MEM of the multimedia terminal MS, such as from a fixed disk (not shown), or from the Internet network, e.g. from a server 20, or multimedia components can be built up for example by writing desired text, taking pictures with a camera, recording sounds, etc. FIG. 6a shows an example of such a multimedia page. The multimedia page MP of FIG. 6a comprises a picture PIC1 placed in the middle of the page and stored e.g. in a file "PIC1.jpg" and above the picture a text line TXT1 which is stored e.g. in a file "TXT1.txt."

Figure 5A:
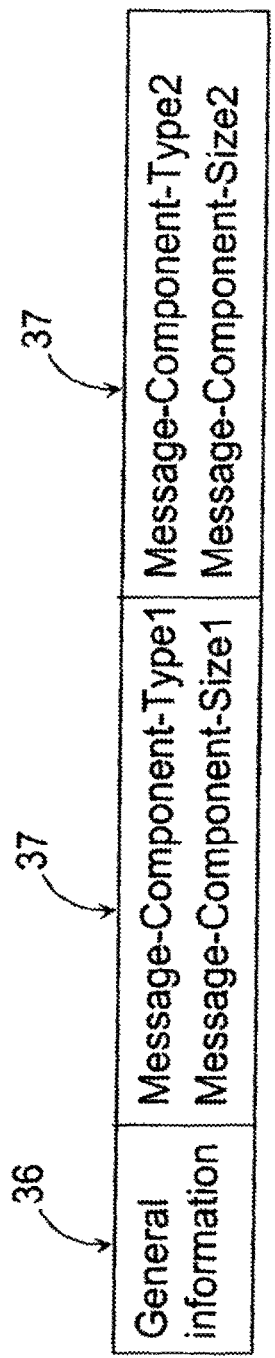
FIG. 5a shows the rough structure of a notification message.

After the multimedia page has been edited to the desired format, it is transferred to a compiling block COMP to form a multimedia file. This multimedia file is used to store information about the components which it contains as well as a model for presenting the components in a desired way in the multimedia terminal of the receiver. The compilation file formed in the compiling block COMP is preferably stored in the memory means MEM of the device setting up the message, such as the multimedia terminal. In this embodiment, the format used in the compilation file is the SMIL format (synchronized multimedia integration language), known per se. The compilation file is preferably stored as a text file, such as SMIL 1.text, but it can also be stored in another format, e.g., in binary form. The content of the compilation file formed of an example of the multimedia page of FIG. 5a is, in the SNAIL format, the following:

```
<Smil>
    <head>
        <layout>
            <root-layout width="160" height="160"/>
            <region id="up" width="160" height="20"
            left="O" top="1O"/>
            <region id="center" width="160" height="120"
            left="O" top="40"/>
        </layout>
    </head>
    <body>
        <img src=" PIC1 .jpg"region="center"/>
        <text src="TXT1.txt"region="up"/>
    </body>
</smil>
```

The texts indicated within tags are data types according to the SMIL format as well as parameters possibly related thereto. In the data file, there is first a <Smil> data type which informs that it is a compilation file SMIL complying with the SMIL format in question. Next, presentation parameters are defined, such as the width (width=160) and height (height=160) of the display field, as well as two named fields of this display field, their size and location; "up" and "center". The width of the field "up" is defined as 160 and the height as 20. In addition, the location of the upper left corner of this field is determined as 0 in the horizontal direction (left edge) and 10 in the vertical direction. The measurement units are preferably pixels, but also other units can be used, such as percentages of the size of the display field. The width of the field "center" is defined as 160, the height as 120 and the location of the upper left corner as 0, 40. This presentation parameter is followed by a data part (body) indicating which multimedia components the page contains and where they can be found. Further, of the visual components (image, video, text), it is indicated in which location on the page they are placed. Consequently, this example contains two files of which the image file is placed in the field "center" and the text file in the field "up".

Figure 6B:
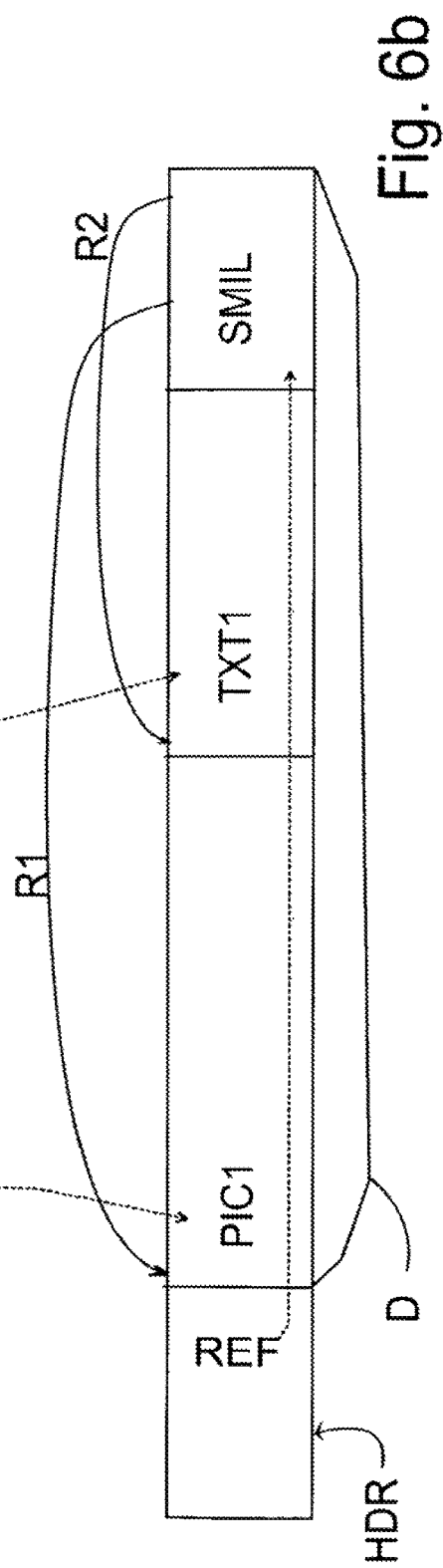
FIG. 6b shows the rough structure of a multimedia message formed by the method according to the disclosed embodiments.

This compilation file SMIL and the components related thereto is transferred to the receiver by means of a multimedia message. This is formed in a method according to the disclosed embodiments in the following way. In the transmitting multimedia terminal MS', the compilation file SNAIL is transferred to a message set up block MSG. Of the memory MEM, a space is reserved for a message buffer SBUF in which the multimedia message to be transmitted is formed. FIG. 6b shows an example of such a multimedia message in a reduced view. At the beginning of the multimedia message, or in another determined location in the multimedia message, a header HOR is added, containing e.g. address data of the receiver of the message, address data of the transmitter, and a reference REF to the location of the compilation file in the message to be formed. In addition to the header, the data field 0 of the message is supplemented with multimedia components, which in this example are an image file and a text file. The files are added either as such, or they can be compressed or converted to another format. Thus, the message preferably indicates in which format the files are attached, so that it is possible at the receiving multimedia terminal to perform the corresponding inverse operation to the conversion, to restore the original data format. Furthermore, the multimedia message is supplemented with a compilation file. At this stage, references to multimedia component files possibly existing in the compilation file are converted to references to the respective multimedia components in this message. In FIG. 6b, arrows R1 and R2 indicate these internal references in the message.

Figure 6C:
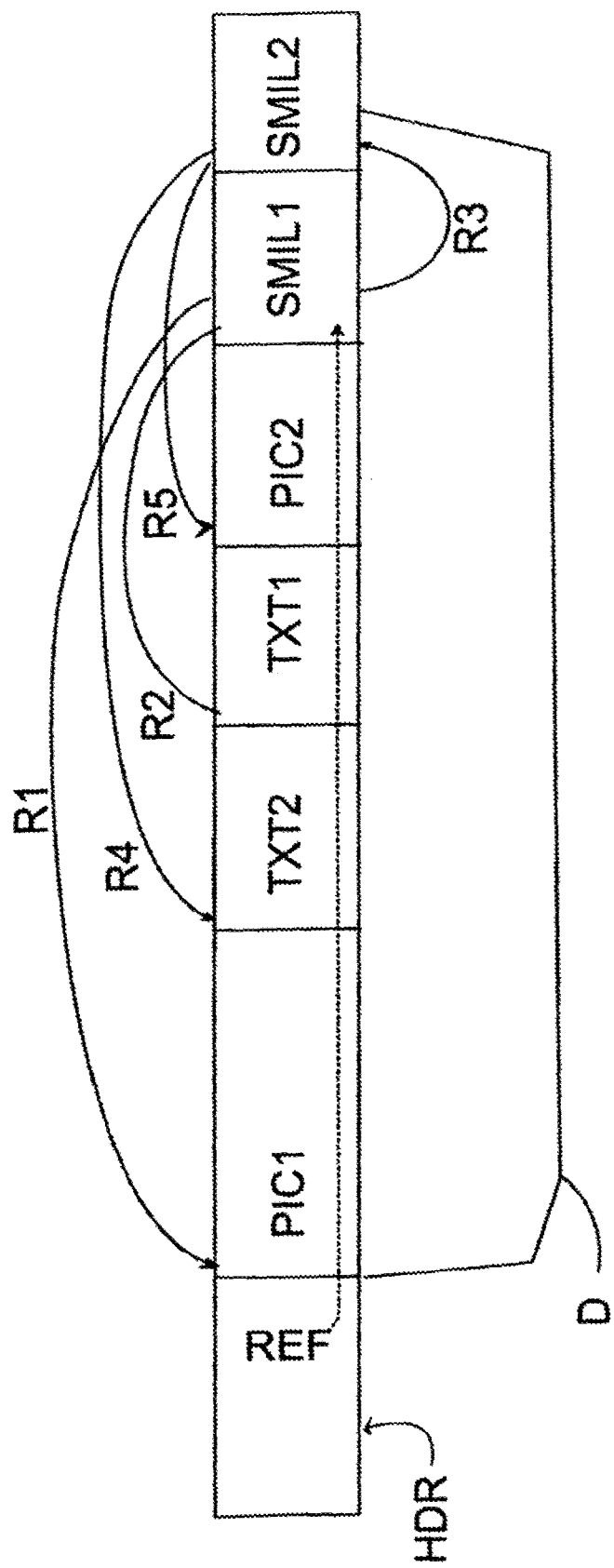
FIG. 6c shows another rough structure of a multimedia message formed by the method according to the disclosed embodiments.

In the multimedia message, it is also possible to transmit multimedia presentations consisting of several multimedia pages. For each page, a separate compilation file is preferably formed, in which the presentation model of the respective page is attached. Such multimedia presentations contain for example various images and texts which the receiver of the message can browse either in a certain order or in a desired order. Thus, the multimedia page is provided with links or references to the next page, the previous page, the beginning, and/or the end. These references are also stored in the compilation files. Thus, when setting up the multimedia message, these references are converted to correspond to the location of the components of the respective page in the message. FIG. 6c shows an example of such a multimedia message. It consists of two multimedia pages, the corresponding compilation files being indicated with the references SMIL1 and SMIL2, of which the first contains a reference (arrow R3) to another page. The components of these pages (references indicated with arrows R1-R5) and the compilation files are also attached to this message. It is obvious that the references on different pages can also be directed to the same component.

Instead of information contained in the multimedia component, the presentation model can be supplemented with a search address at the stage when the content of the multimedia message is presented in the receiving terminal.

After the multimedia message is ready to be transmitted, the multimedia message is transmitted in a way known as such to the multimedia message service center MMSC. From the address data of the message, the multimedia message service center MMSC examines to which mobile terminal MS the message in question is intended. The address data can be e.g. a phone number, an IP address or URL (Uniform Resource Locator). When the terminal to receive the message is found out, the multimedia message service center MMSC transmits a notification message 30 via the WAP gateway 15 to the mobile terminal MS, to notify about the arrival of a multimedia message addressed to the mobile terminal MS at the multimedia message service center MMSC.

The notification message 30 is preferably transmitted by using a so-called connection less service supported e.g. by the WAP. In a connectionless service, such as the short message service (SMS) known from the GSM system, the transmission of a message to the receiver does not require setting up of a connection. In the present transmission of multimedia messages to a wireless terminal MS according to the disclosed embodiments, however, a connection oriented service is preferably used.

The multimedia message service center MMSC can examine which multimedia components are contained in the message and compare them with the multimedia properties of the receiving terminal MS. Thus, in some applications, the multimedia message service center MMSC can leave such components which the receiving multimedia terminal MS is not capable of processing, untransmitted. In this context, however, it is assumed that all the components of the multimedia message are transmitted to the receiving multimedia terminal MS.

Figure 5B:
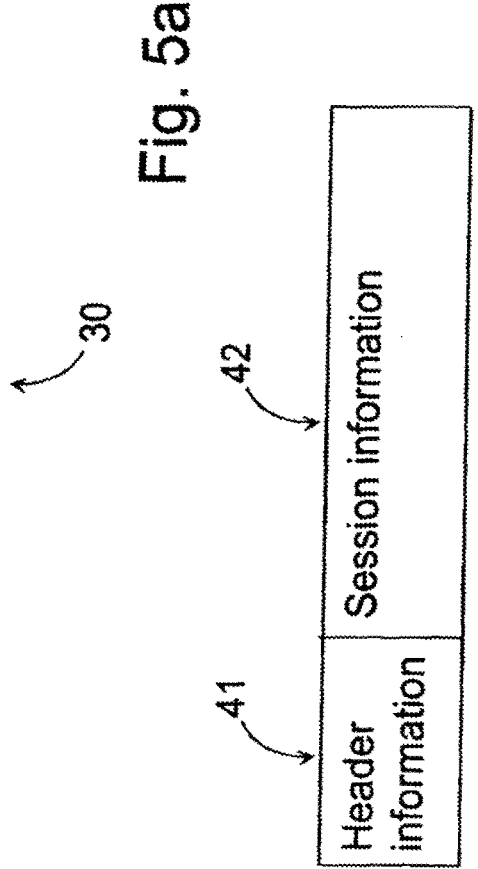
FIG. 5b shows the rough structure of a connection set-up message.

After receiving said notification message 30, the mobile terminal MS first starts to set up a connection to the multimedia message service center MMSC (WAP WSP CONNECT), if there is no connection between the mobile terminal MS and the multimedia message service center MMSC at the moment. Connection set-up is typically performed in such a way that the wireless terminal MS opens a WSP session with the WAP gateway 15 in a way known as such, and the WAP gateway 15 further opens e.g. an IP connection to the multimedia message service center MMSC. Information about the gateway selected by the mobile terminal MS and to be thus used in the WSP session is transmitted from the wireless terminal MS in a way known from the WAP as a bearer indication value in the WSP header field. During opening the WSP session, said information is transmitted during communication between the mobile terminal MS and the WAP gateway 15 e.g. in a connection set-up message 40 (FIG. 5b).

Information 42 required for setting up a session is transmitted in the connection set-up message 40. The multimedia message service center MMSC receives the connection set-up message 40. The multimedia message service center MMSC replies to the connection set-up message with an acknowledgement message, in which the mobile terminal MS is notified if it is possible to set up a connection. Connection set-up can fail for example when the user of the terminal addressed as the receiver of the multimedia message has no subscriber contract with the multimedia message service, the phone line is closed e.g. because of unpaid bills, etc.

After a connection has been set up, it is possible to start the transmission of the multimedia message from the multimedia message service center MMSC to the mobile terminal MS. To optimize the radio resources, the mobile terminal MS can select the transmission path which is most expedient for the transmission of each different multimedia component.

After the receiving multimedia terminal MS has received the multimedia message, the message is processed. At the receiving stage, the message is dismantled in a receiving block RMSG and preferably stored in a message buffer RBUF formed in the memory MEM. The processing of the message takes place e.g. in an interpretation block IP formed in the application software of the processor MPU. The multimedia properties of the multimedia terminal, such as the display resolution, color properties, audio properties, etc. are transferred to the interpretation block IP.

From the header of the message, the interpretation block IP examines the reference to the location of the compilation file and starts to process the compilation file. At this stage, the substantially inverse operations with respect to the compilation stage are executed. The parameters of the compilation file disclose the presentation parameters of the multimedia message which are compared by the interpretation block IP with the multimedia properties of the multimedia terminal MS to find out if the multimedia message contains such components which cannot be presented in the multimedia terminal MS. In this case, such components can be by-passed.

After finding out the presentation parameters and comparing the properties, the interpretation block. IP processes the data part, i.e. the multimedia components. With the above-presented example as the compilation file, the data part consists of an image component and a text component. Thus, the interpretation block IP examines the references to these components in the compilation file. The data of the image component are transferred by the interpretation block IP from the multimedia message to an image memory DMEM which is preferably formed in the memory means MEM of the mobile terminal, in a space which corresponds to the presentation location of the image defined in the compilation file. The text file is transferred by the interpretation block IP to a display driver (not shown), in which the text is converted to corresponding visual information (text) on the display DP of the user interface UI. In the case of a possible audio component, the interpretation block IP transfers the audio information to the audio means AUDIO of the user interface, where the audio information is converted to an audible sound in a way known per se.

In the processing of such multimedia messages which contain several multimedia pages, the procedure is the following. The interpretation block IP searches for the data of the page to be presented first and interprets the page in the way described above. After this, the Interpretation block remains waiting for a command to change the page, entered e.g. by the user with the keyboard KB of the user interface UI. After the command to change the page, the interpretation block searches for the data of the next page and interprets that, etc. On the other hand, the change of the pages can also be automated by defining a display time for each page. Thus, time is measured in the multimedia terminal MS, and after the expiry of the display time, the interpretation block IP is notified of the command to change the page.

In a multimedia presentation, a component can also be allocated a time of effect, such as a time to display an image or a text or a time to repeat a sound. Furthermore, various components can be synchronized with each other in time. In such situations, the compilation file is also supplemented with data about the time of effect for a component and, if necessary, also data about the mutual synchronization of various components, e.g. the moment of starting to present a component with respect to the moment of starting the presentation of a page.

The above description dealt with, at least one embodiment, in which the presentation model was formed in the terminal MS' which transmitted a message; however, the at least one embodiment can also be applied in such a way that the presentation model is compiled at the multimedia message service center MMSC before transmitting the message to the receiving terminal MS. Also in this case, the multimedia presentation can be set up in the transmitted terminal MS', from which information about the content of the multimedia presentation for compiling the presentation model is transmitted to the multimedia message service center MMSC.

It is obvious that the above description presented only a limited group of a variety of possible multimedia messages, but the presently disclosed embodiments are not restricted solely to the examples presented herein.

The disclosed embodiments can also be implemented in software by making the necessary modifications in the program code in the mobile terminal MS and, if necessary, also in the multimedia message service center MMSC. The computer software products in question can be stored on a data means, for example in a memory, they can be transferred and they can be run for example in a computer or in the microprocessor of a mobile phone.

The multimedia terminal MS, MS' can also implement operating system functions. The operating system is implemented as program commands of the processor. The operating system is primarily responsible for the controls, timings, supervision, etc. of the functions of the multimedia terminal MS, MS'. In addition, the operating system takes care of starting the operation of the compiling block, performing the functions of transmitting and receiving the message, starting the interpretation block, transferring the message to be processed by the interpretation block, etc. These operating system functions and their application in connection with the method according to the disclosed embodiments are prior art applicable to anyone skilled in the art, wherein their more detailed discussion will not be necessary in this context.

It is obvious that the presently disclosed embodiments are not limited solely to the embodiments presented above, but can be modified within the scope of the appended claims.

What is claimed is:

1. An apparatus for sending at least one multimedia component for presentation at receiving terminal comprising:
    a user interface;
    a transmitter;
    a processor coupled with the user interface and transmitter; and,
    a memory coupled with the processor, the memory including computer program code which when executed causes the processor, to control the apparatus to:
        receive input at the user interface setting up a multimedia presentation including at least one multimedia component, the multimedia presentation to be sent in a message;
        add a presentation model to the message including the at least one multimedia component, the presentation model including information for presenting the at least one multimedia component at the receiving terminal according to the input, and a reference related to the at least one multimedia component, wherein the at least one multimedia component comprises audio information and the information for presenting the at least one multimedia component includes information about converting the at least one multimedia component into an audible sound;
        supplement the reference in the presentation model with an internal reference to a location of the at least one multimedia component in the message; and, transmit the message including the multimedia presentation and the presentation model from the transmitter to the receiving terminal.

2. The apparatus of claim 1, wherein the computer program code when executed, further causes the processor, to control the apparatus to form the presentation model using an synchronized multimedia integration language (SMIL) format.

3. The apparatus of claim 1, wherein computer program when executed, further causes the processor, to control the apparatus to supplement the presentation model with a search address.

4. The apparatus of claim 1, wherein the computer program code, when executed, causes the processor, to control the apparatus to supplement the presentation model with information about a time of effect of the multimedia component.

5. The apparatus of claim 4, wherein the information about a time of effect of the multimedia component includes a time of repeating the audible sound.

6. The apparatus of claim 1, wherein the message comprises at least two multimedia components, and the computer program code, when executed, causes the processor, to control the apparatus to supplement the presentation model with information about a mutual synchronization of the at least two multimedia components.

7. An apparatus for sending at least one multimedia component for presentation at receiving terminal comprising: a user interface;
a transmitter;
a processor coupled with the user interface and transmitter; and,
a memory coupled with the processor, the memory including computer program code; which when executed causes the processor, to control the apparatus to:
receive input at the user interface setting up a multimedia presentation including at least one multimedia component, the multimedia presentation to be sent in a message;
add a presentation model to a message including the at least one multimedia component, the presentation model including information for presenting the at least one multimedia component at the receiving terminal and a reference related to the at least one multimedia component, wherein the at least one multimedia component comprises audio information and the information for presenting the at least one multimedia component includes information about a time of effect of the multimedia component and data about converting the at least one multimedia component into audible sound;
supplement the reference in the presentation model with an internal reference to a location of the at least one multimedia component in the message; and,
transmit the message including the multimedia presentation and the presentation model from the transmitter to the receiving terminal.

8. The apparatus of claim 7, wherein the computer program code when executed, further causes the processor, to control the apparatus to form the presentation model using an synchronized multimedia integration language (SMIL) format.

9. The apparatus of claim 7, wherein computer program when executed, further causes the processor, to control the apparatus to supplement the presentation model with a search address.

10. The apparatus of claim 7, wherein the at least one multimedia component comprises audio information, and the computer program code, when executed, causes the processor, to control the apparatus to supplement the presentation model with data about converting the at least one multimedia component into an audible sound.

11. The apparatus of claim 10, wherein the information about a time of effect of the multimedia component includes a time of repeating the audible sound.

12. The apparatus of claim 7, wherein the message comprises at least two multimedia components, and the computer program code, when executed, causes the processor, to control the apparatus to supplement the presentation model with information about a mutual synchronization of the at least two multimedia components.

13. The apparatus of claim 7, wherein the message comprises at least two pages, and the computer program code, when executed, causes the processor, to control the apparatus to supplement the presentation model with data about an order of presenting the at least two pages.

14. An apparatus for sending at least two multimedia components for presentation at receiving terminal comprising:
a user interface;
a transmitter;
a processor coupled with the user interface and transmitter; and,
a memory coupled with the processor, the memory including computer program code, which when executed causes the processor, to control the apparatus to:
receive input at the user interface setting up a multimedia presentation including at least two multimedia components, the multimedia presentation to be sent in a message;
add a presentation model to a message including the at least two multimedia components, the presentation model including information for presenting the at least two multimedia components at the receiving terminal and a reference related to the at least two multimedia components, wherein the at least two multimedia components comprise audio information and the information for presenting the at least two multimedia components includes information about a mutual synchronization of the at least two multimedia components and data about converting the at least two multimedia components into audible sound;
supplement the reference in the presentation model with an internal reference to a location of the at least two multimedia components in the message; and,
transmit the message including the multimedia presentation and the presentation model from the transmitter to the receiving terminal.

15. The apparatus of claim 14, wherein the computer program code when executed, further causes the processor, to control the apparatus to form the presentation model using an synchronized multimedia integration language (SMIL) format.

16. The apparatus of claim 14, wherein computer program when executed, further causes the processor, to control the apparatus to supplement the presentation model with a search address.

17. The apparatus of claim 14, wherein the at least two multimedia components comprise audio information, and the computer program code, when executed, causes the processor, to control the apparatus to supplement the presentation model with data about convening the at least two multimedia components into audible sound.

18. The apparatus of claim 14, wherein the computer program code, when executed, causes the processor, to control the apparatus to supplement the presentation model with information about a time of effect of each of the at least two the multimedia components.

19. The apparatus of claim 18, wherein the information about a time of effect of the at least two multimedia components includes one or more of a display time of an image or a text, or a time of repeating a sound.

20. The apparatus of claim 14, wherein the at least two multimedia components comprise at least two pages, and the computer program code, when executed, causes the processor, to control the apparatus to supplement the presentation model with data about an order of presenting the at least two pages.

\* \* \* \* \*